United States Patent Office 3,492,152
Patented Jan. 27, 1970

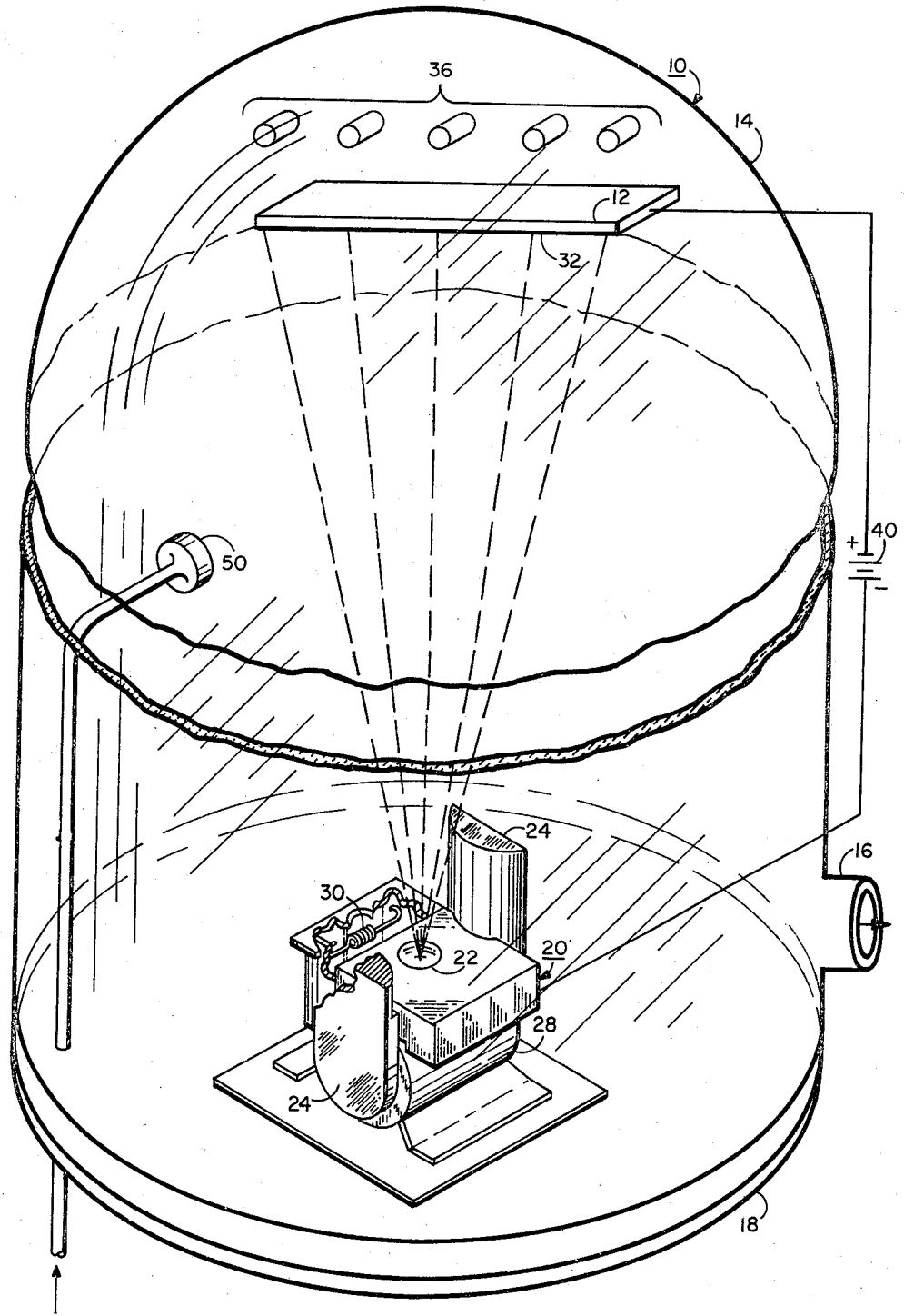

3,492,152
METHOD OF VACUUM VAPOR DEPOSITING A MATERIAL ON A SUBSTRATE INCLUDING RECONSTITUTION OF DECOMPOSED PORTIONS OF THE MATERIAL
Frank E. Cariou and Maria M. Gajary, Rochester, N.Y., assignors to General Dynamics Corporation, a corporation of Delaware
Filed Jan. 30, 1967, Ser. No. 612,616
Int. Cl. C23c *11/00;* B44d *1/48*
U.S. Cl. 117—93.4         4 Claims

ABSTRACT OF THE DISCLOSURE

Method for enhancing deposition of a coating upon a substrate which includes establishing an electric field between the evaporation source and the substrate for focusing generated gas ions onto the substrate and in certain instances enhancing the deposition processes by injecting gas in either an atomized or ionized form between the evaporation source and the substrate.

---

The present invention relates to methods of vacuum deposition of materials upon a substrate.

In one prior vacuum deposition technique, a metal, such as for example Ta, Nb, Ti, Hf or Al, is evaporated onto a substrate where the metal bonds to the material comprising the substrate to form a continuous metallic film. This metallic film is then reacted with oxygen and at least a surface layer thereof is thereby converted into an oxide of the metal which generally is selected for its dielectric properties. The unoxidized portion of the first deposited metal can be used to form an electrode. This arrangement has disadvantages in that for microcircuit applications in order to form the oxide layer, the substrate must be removed from the vacuum system for anodization, which is carried out in an electro-chemical solution. Thereafter, the substrate may be returned to the vacuum system to deposit the second electrode.

In a second vacuum deposition arrangement, oxide films are formed in situ on top of a metal electrode by plasma anodization in, say, a partial oxygen atmosphere. Films formed by this method have undesirable or inferior dielectric properties such as low breakdown voltages, high dissipation factors, and low insulation resistance when compared with films formed by the first mentioned method.

In a third approach that has been employed, a dielectric material such as $Ta_2O_5$ or $Al_2O_3$ has been directly evaporated to form the desired film. Put another way, the film is not formed by a chemical reaction but is directly deposited upon a substrate. In connection with this approach, generally an electron beam gun is used as the evaporation source, inasmuch as many of the desired refractory metals are characterized by high melting points and low vapor pressures. Films formed in this way are often found to have inferior properties, many of which are the same as those listed for the second approach.

In view of the foregoing, it is an object of the present invention to provide an improved method and apparatus for forming dielectric films, both thick and thin, by vacuum evaporaton.

It is believed that one of the reasons that many dielectric films formed by vacuum deposition techniques have some inferior properties is that they actually do not possess the desired chemical composition. More particularly, during the evaporation process of certain materials, decomposition product are formed, portions of which do not recombine due to adsorption on the chamber walls, removal by the pumps etc. Hence, the chemical composition of deposited film is actually deficient in some constituent, such as oxygen. On the other hand some of the decomposition products may be ionized, particularly if there are strong fields present, as is the case when an electron beam gun is used as evaporation source.

It has been found, in accordance with the invention, that by applying sufficient electric field between the evaporation source and the substrate, many of these ions may be directed onto the substrate, and the film coating formed may have a composition closer to that which is desired. In order to still further insure that the film will have a chemical structure closely resembling the desired one, it is preferable to inject additional gas ions which will be acted upon by the electric field, thereby compensating for any ions that may still have been lost to the vacuum pump.

It should be made clear at the outset that the present invention may be employed in many methods of film deposition such as the above mentioned three wherein the evaporation source may be provided, for example by an electron beam gun or a resistance heating unit.

The invention itself, both as to its organization and method of operation, as well as additional objects and advantages thereof will become more readily apparent from a reading of the following description taken in connection with the accompanying drawing the sole figure of which is a diagrammatic representation of electron beam evaporation apparatus which embodies and which may be employed to practice the present invention.

Referring to the drawing, there is shown an electron beam evaporation apparatus 10 which may be used for evaporating material for the purpose of coating the surface of the substrate 12. The apparatus 10 includes a glass bell jar 14 having a conduit 16 connected to the interior of the bell jar which is coupled to a vacuum pump (not shown). During the evaporation process the pump is operated to produce a high vacuum within the bell jar interior, say in the range from about $5 \times 10^{-5}$ to $2 \times 10^{-9}$ torr. Positioned within the bell jar is a crucible 20 which is provided with a cavity 22 adapted for receiving material to be evaporated in either particle, liquid or solid form. Two spaced pole members 24 extend upwardly from the top surface of the crucible and at their bottom ends are coupled to a source of electro-magnetic energy (viz. a coil 28). The crucible 20 is also provided with a shielded filament 30 and is in communication with a coolant (not shown). In operation the pole pieces 24 produce a directed magnetic field that focuses a beam of electrons delivered from filament 30 directly upon the cavity 22, evaporating the material placed in the cavity. The evaporated material deposits as a film of the material upon a surface 32 of the substrate member 12. Also shown schematically within the bell jar are quartz lamp infra-red heaters 36. As thus far described the apparatus 10 is conventional or is commercially readily available for sale by a number of companies such as for example, The Ultek Corporation of Palo Alto, Calif. (see for example their Model 155, Bulletin B–1300).

It is believed that certain materials when evaporated break down into a series of constituents, some of which are in atomic or molecular form and others of which are in ionic form. For example, the following reactions illustrate this effect:

(1) $Ta_2O_5(Solid,Liquid) \rightarrow Ta_2O_5(Gas) + Ta(Gas) + TaO_2(Gas) + TaO(Gas) + O_2(Gas) + O(Gas) + O^{-(Gas)} + O_2^{-(Gas)}$
(2) $Al_2O_3(S,L) + heat \rightarrow Al_2O_3(G) + Al(G) + Al_2O(G) + AlO(G) + O_2(G) + O(G) + O^-(G) + O_2^-(G)$
(3) $HfO_2(S,L) + heat \rightarrow Hf(G) + O_2(G) + O(G) + O^-(G) + O^-_2(G) + HfO_2(G) + HfO(G)$
(4) $ZrO_2(S,L) + heat \rightarrow ZrO_2(G) + ZrO(G) + Zr(G) + O_2(G) + O(G) + O_2^-(G) + O^-(G)$ In accordance with this invention, an electric field is preferably applied between the substrate 12 and the crucible 20 by means of a high DC voltage power supply shown schematically by a battery 40. As mentioned above, the field created between the pole pieces 24 affects the transfer of ions from the crucible 20 to the substrate 12. Without the electric field it is believed that a significant number of ions are held near the crucible 20 or drawn off by the vacuum pump, and consequently the deposited coating on the substrate will be deficient in for example, oxygen and hence will have somewhat inferior properties. By applying sufficient electric field, many of the ions that otherwise would remain near the crucible 20 will be focused upon the surface 32 of the substrate 12.

The following tables demonstrate the beneficial results which are achieved by applying voltage of sufficient level between the substrate and crucible when a refractory material is evaporated:

TABLE I.—($Ta_2O_5$)

| Film thickness, A. | Voltage applied during deposition | Specific capacitance, pf./cm.$^2$ | Dissipation factor, percent |
|---|---|---|---|
| 2,800 | 0 | $9 \times 10^4$ | 5.7 |
| 1,530 | 0 | $18 \times 10^4$ | 14.3 |
| 730 | 1,000 | $32 \times 10^4$ | 1.4 |
| 140 | 1,500 | $77 \times 10^4$ | 1.6 |
| 300 | 3,000 | $53 \times 10^4$ | 0.9 |
| 2,900 | 3,000 | $99 \times 10^4$ | 1.0 |

TABLE II.—($Al_2O_3$)

| Film thickness A. | Voltage applied during deposition | Specific capacitance, pf./cm.$^2$ | Dissipation factor, percent | Dielectric constant, K |
|---|---|---|---|---|
| 2,671 | 0 | 25,651 | 0.44 | 7.74 |
| 2,642 | 0 | 26,415 | 0.43 | 7.88 |
| 2,604 | 1,500 | 27,721 | 0.48 | 8.16 |
| 2,667 | 1,500 | 27,309 | 0.52 | 8.23 |
| 2,625 | 1,500 | 27,749 | 0.49 | 8.23 |

In making the films specified above the crucible and substrate were spaced 35 centimeters apart. The thickness of the deposited films were measured by a commercially available profilometer, whereas the specific capacitance and dissipation factors were measured by a General Radio Corporation, capacitance bridge No. 716 B operating at 1 kilohertz.

In examining the results of the data shown in Table I, the dissipation factor is substantially improved when $Ta_2O_5$ is subjected to a field created by a voltage difference of greater than about 1000 volts, whereas with $Al_2O_3$ as shown in Table II the improvement is in dielectric constant rather than in dissipation factor.

The applied voltage required to obtain the improvements, depends of course on the size of the evaporation apparatus, the spacing between the source and the substrate and the particular material being evaporated may be readily determined experimentally for different refractory oxides and other materials by making up and measuring a few samples. For the herein described apparatus, for $Ta_2O_5$ and $Al_2O_3$, it has been found that at least 500 volts DC corresponding to a field intensity of about 14 volts per centimeter is preferable.

The source to substrate spacing (viz. relative location) and field intensity are of course factors of the geometry employed. By making a series of depositions and performing the tests specified above, preferred spacings and field intensities may be obtained.

It should be understood that the invention is not limited to materials having an oxygen component that ionizes such as the previously mentioned materials as well as $Nb_2O_5$, $TiO_2$, $MgO$, $V_2O_5$, $SiO_2$, etc. but is equally useful in the evaporation of metal nitrides, hydroxides and other materials which decompose and/or ionize. Of course, the polarity of the electric field must be selected to take into consideration the charge on the particular ion generated when the material is evaporated. Similarly, optimum field values exist for any given material being deposited. For example, if the material being evaporated is $Ta_2O_5$, then attempts to produce too great a field to retrieve negatively ionized oxygen may cause a portion of the fractional compounds such as $TaO_2$ and $TaO$, which may be positively ionized, to be repelled. In other words, if too great an electric field is applied between the substrate and crucible in order to direct the negatively ionized oxygen atoms, some of the positive ions will be deflected away from the substrate by electrostatic repulsion. The optimum field magnitude is then a compromise between these competing factors.

It has been found that the reconstruction of the deposited film may be still further enhanced by injection of additional gas. Preferably, the injected gas should be ionized so that it will be attracted by the field applied between the substrate and the crucible. So for example, in the case of $Ta_2O_5$ it has been found most beneficial to inject oxygen ions by means of a nozzle 50 into the bell jar in a region spaced from the electron beam gun pole pieces a sufficient distance so the injected ions are not significantly affected by the magnetic field but are more influenced by the electric field applied between the crucible and the substrate. In this way films with the proper stoichiometry may be produced. In order to ionize the injected gas the nozzle 50 is preferably provided at its free end with a heated wire mesh which is adapted to dissociate the injected gas and a radio frequency coil which is adapted to ionize the dissociated gas. Moreover, several sources of different gas may be used at the same time.

While various embodiments of the invention have been described, variations thereof and modifications therein within the spirit of the invention will undoubtedly suggest themselves to those skilled in the art. For example, although an electron beam apparatus has been shown as the evaporation source, other conventional heat sources such as resistance heated arrangements may also be used. Still further it should now be clear that the various film deposition methods mentioned earlier in the introduction of the specification may all be adapted to employ the present invention. In addition, although it is presently believed preferable to employ an electric field, it will be understood that a magnetic field or a combination of electric and magnetic fields may also be used in accordance with the invention for focusing ions. Accordingly, the foregoing description should be taken as illustrative and not in any limited sense.

What is claimed is:

1. In a method of vacuum vapor depositing a material to form a layer or film on a substrate surface wherein due to the evaporating process said material breaks down in part into a series of constituents at least some of which are in ionic form and some of which are lost by absorption on surfaces of the vaporization system, the steps comprising (a) establishing an electric field in a region which field is directed to deliver charged ionic particles towards the surface of said substrate, and (b) simultaneously with step (a) injecting additional ionic particles, having the same chemical form as those produced by evaporation of said material, into the said region, whereby the formed layer of film will be reconstructed to have substantially the same stoichiometry as if all of the evaporated constituents had been deposited.

2. The invention as set forth in claim 1 wherein said evaporated material is $Ta_2O_5$ and said injected ionized gas is oxygen.

3. The invention as set forth in claim 1 wherein said evaporated material is $Al_2O_3$ and said injected ionized gas is oxygen.

4. The invention as set forth in claim 1, wherein said electric field has an intensity of at least 10 volts per centimeter.

References Cited

UNITED STATES PATENTS

| | | | |
|---|---|---|---|
| 2,904,452 | 9/1959 | Reichelt | 117—106 |
| 2,932,588 | 4/1960 | Frank | 117—106 |
| 3,192,892 | 7/1965 | Hanson et al. | 117—93.3 X |
| 3,290,567 | 12/1966 | Gowen | 117—93.4 X |
| 3,329,601 | 7/1967 | Mattox | 204—192 X |

OTHER REFERENCES

Holland: Vacuum Deposition of Thin Films, Chapman & Hall Ltd., London (1963) p. 517.

ALFRED L. LEAVITT, Primary Examiner

J. H. NEWSOME, Assistant Examiner

U.S. Cl. X.R.

117—93, 93.3, 106